United States Patent
Yuan et al.

(10) Patent No.: US 12,282,172 B1
(45) Date of Patent: Apr. 22, 2025

(54) SMART WEARABLE DEVICE

(71) Applicant: AAC ACOUSTIC TECHNOLOGIES (SHENZHEN) CO., LTD., Shenzhen (CN)

(72) Inventors: Junhao Yuan, Shenzhen (CN); Xiuliang Xie, Shenzhen (CN); Hongyan Tao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/628,846

(22) Filed: Apr. 8, 2024

Related U.S. Application Data

(63) Continuation of application No. PCT/CN2023/133829, filed on Nov. 24, 2023.

(51) Int. Cl.
*G02B 27/01* (2006.01)

(52) U.S. Cl.
CPC .. *G02B 27/0176* (2013.01); *G02B 2027/0178* (2013.01)

(58) Field of Classification Search
CPC ............................ G02B 27/01; G02B 27/0176
See application file for complete search history.

*Primary Examiner* — Sardis F Azongha
(74) *Attorney, Agent, or Firm* — Wiersch Law Group

(57) ABSTRACT

The present invention provides a smart wearable device includes a glass frame and a pair of temples. The glass frame includes a connecting portion. Each temple includes a shelf, a cover plate, and a rotating shaft assembly matched with the connecting portion. The shelf includes an upper wall and a lower wall. The rotating shaft assembly includes a first rotating shaft bracket, a second rotating shaft bracket, a screw, and a positioning bead assembly. The positioning bead assembly is movably connected between the first and the second rotating shaft bracket to realize a folded and an unfolded state of the smart wearable device. The smart wearable device of the present invention uses a rotating shaft assembly to realize the folded and unfolded states. The smart wearable device has a simple structure, requirements of the processing accuracy and assembly accuracy of components are low, and the development cost is low.

10 Claims, 4 Drawing Sheets

SMART WEARABLE DEVICE

FIELD OF THE PRESENT INVENTION

The present invention relates to the field of smart wearable device, and more particularly, to a connection structure of the glass frame and the temples of the smart wearable device.

DESCRIPTION OF RELATED ART

Most of traditional smart wearable devices, such as smart glasses, only use screws as the axis for the rotation of the temples. There is no damping effect during the rotation of the temples, and the temples tend to shake, resulting in a poor user experience. Furthermore, most of the shaft components used to achieve the damping effect during temple rotation in smart glasses products are numerous and complex in structure. In addition, the requirements for processing accuracy and assembly accuracy of the components are high, resulting in high product development costs.

Therefore, it is desired to provide a new smart wearable device which can overcome the above problems.

SUMMARY

In view of the above, the embodiments of the present invention provide a new smart wearable device, the smart wearable devices has a simple connection structure between the glass frame and the temples, and the requirements for processing accuracy and assembly accuracy of components are low, and the development cost is low.

The present invention provides a smart wearable device includes a glass frame and a pair of temples extending backward from both sides of the glass frame. The glass frame includes a connecting portion connected with the temple. Each temple includes: a shelf, a cover plate covered with the shelf to form a receiving space, and a rotating shaft assembly accommodated in the receiving space and matched with the connecting portion of the glass frame. The shelf includes an upper wall and a lower wall opposite to the upper wall. The rotating shaft assembly includes a first rotating shaft bracket fixed with the upper wall, a second rotating shaft bracket fixed with the lower wall, a screw connected between the first rotating shaft bracket and the second rotating shaft bracket, and at least one positioning bead assembly mounted with the connecting portion. The positioning bead assembly is movably connected between the first rotating shaft bracket and the second rotating shaft bracket to realize a folded state and an unfolded state of the smart wearable device.

As an improvement, the positioning bead assembly includes a housing, a spring contained in the housing, and a bead installed at the end of the spring and partially extending out of the housing, the bead pressing the spring along a direction of a center line of the housing when the bead moves.

As an improvement, a number of the positioning bead assemblies is two, one positioning bead assembly abutting against the first rotating shaft bracket, and the other positioning bead assembly abutting against the second rotating shaft bracket.

As an improvement, a surface of the first rotating shaft bracket facing the positioning bead assembly and/or a surface of the second rotating shaft bracket facing the positioning bead assembly is provided with a first groove and a second groove spaced apart from the first groove, the bead partially located in the first groove when the smart wearable device is in the folded state, and the bead partially located in the second groove when the smart wearable device is in the unfolded state.

As an improvement, the connecting portion of the glass frame is provided with a through hole passing through the connecting portion, and the screw is inserted through the through hole.

As an improvement, the connecting portion of the glass frame includes a receiving groove for receiving the positioning bead assembly.

As an improvement, the first rotating shaft bracket includes a first mounting hole for installing the screw, and the second rotating shaft bracket includes a second mounting hole for installing the screw, the screw passing through the lower wall of the shelf, the second rotating shaft bracket, the connecting portion of the glass frame, and the first rotating shaft bracket in sequence.

As an improvement, the first rotating shaft bracket connected and fixed with the screw by a threaded structure.

As an improvement, the first rotating shaft bracket and the second rotating shaft bracket are made of metal material.

As an improvement, the shelf includes a mounting slot for correspondingly receiving and fixing the first rotating shaft bracket and the second rotating shaft bracket.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Referring to the FIGS. 1-8, the present invention provides one embodiment of a smart wearable device 100. The smart wearable device 100 includes a glass frame 1 and a pair of temples 2 extending backward from both sides of the glass frame 1. Lenses can be installed on the glass frame 1. Two temples 2 have the same structure, and two temples 2 have a centrally symmetrical structure.

Figure 1:
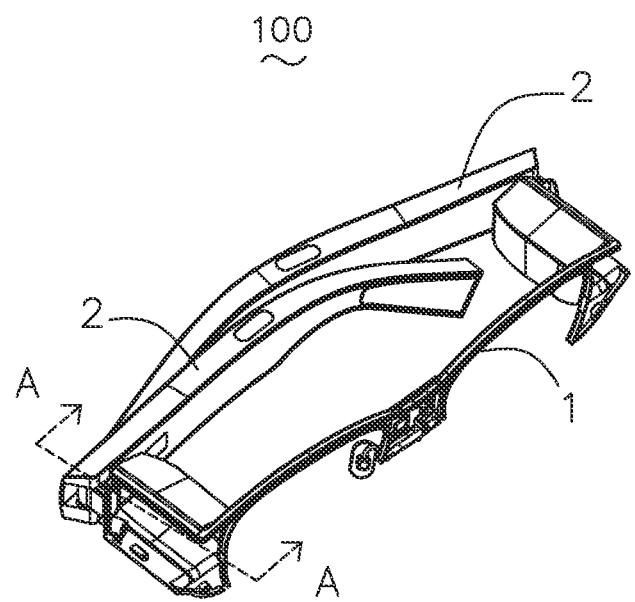
FIG. 1 is an illustrative isometric view of a smart wearable device in the folded state in accordance with one embodiment of the present invention.
Figure 2:
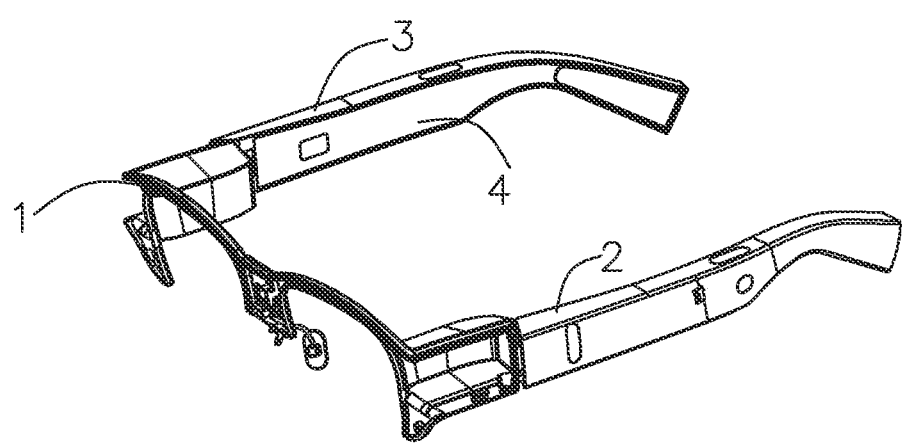
FIG. 2 is an illustrative isometric view of the smart wearable device in the unfolded state in accordance with one embodiment of the present invention.
Figure 3:
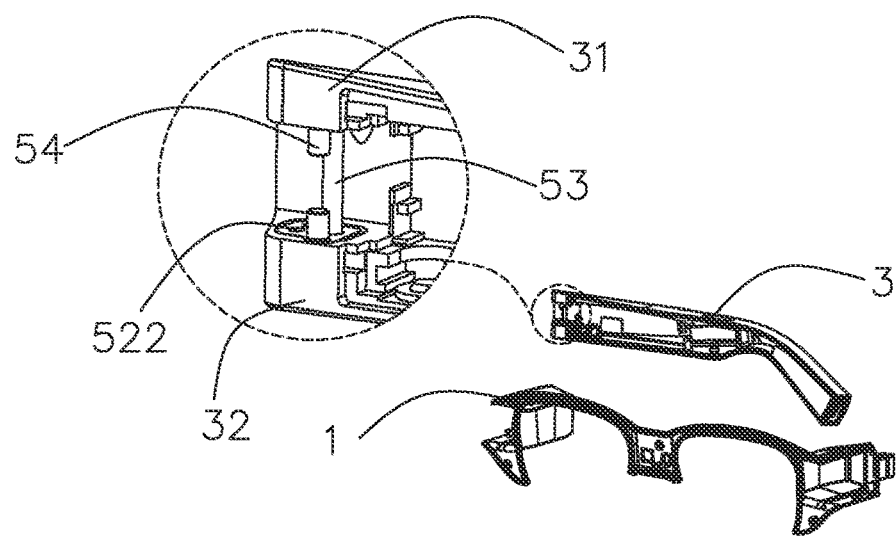
FIG. 3 is a partially exploded view of partly members of the smart wearable device of FIG. 1.
Figure 4:
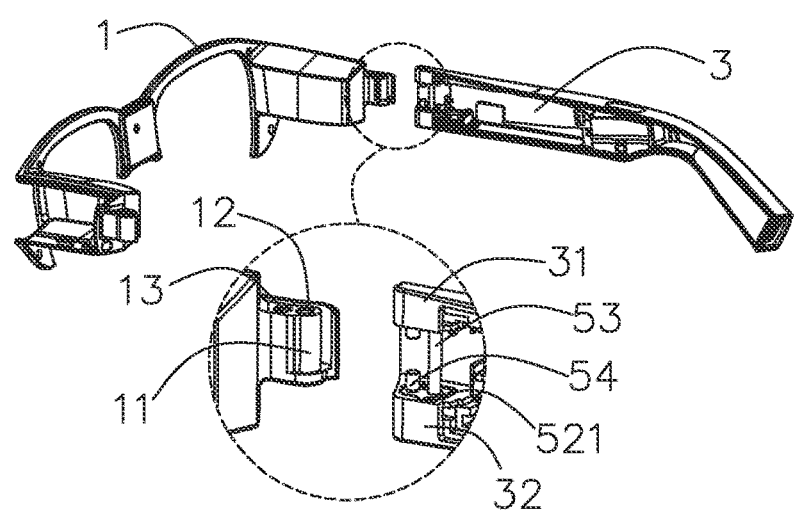
FIG. 4 is a partially exploded view of partly members of the smart wearable device of FIG. 2.
Figure 5:
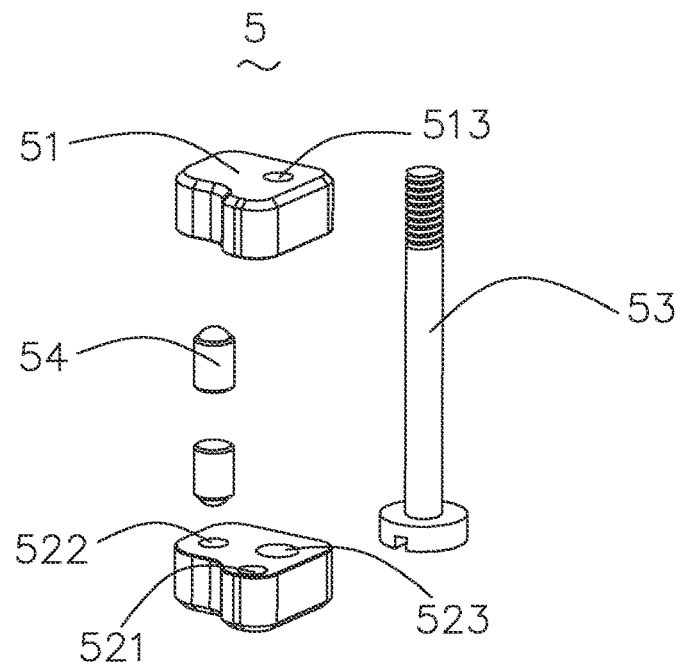
FIG. 5 is an exploded view of the rotating shaft assembly of the smart wearable device of FIG. 1.
Figure 6:
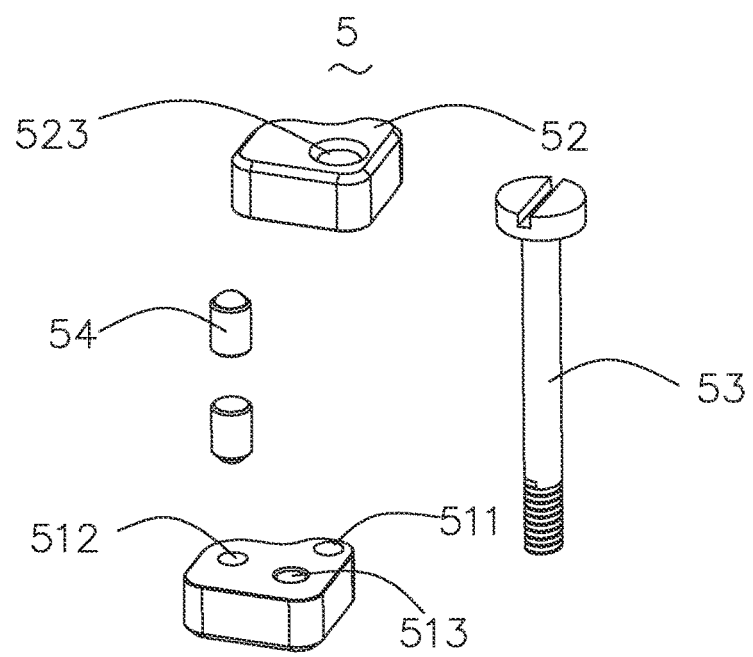
FIG. 6 is an exploded view of the rotating shaft assembly of the smart wearable device in another perspective of FIG. 5.
Figure 7:
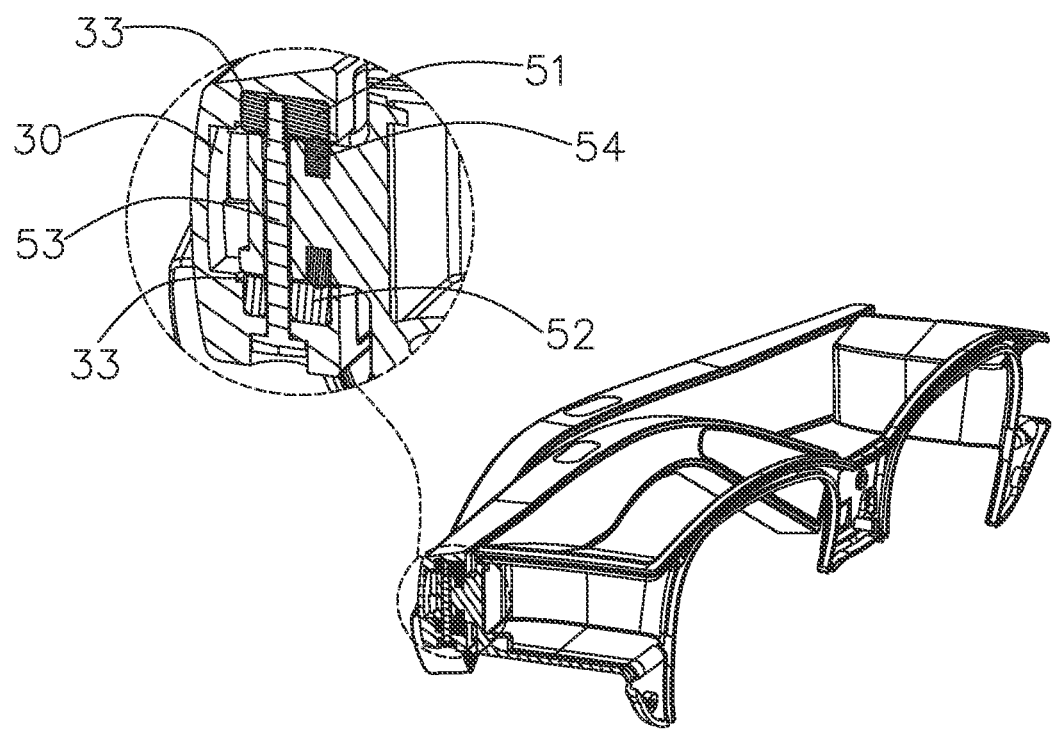
FIG. 7 is an illustrative cross-sectional view of the smart wearable device taken along line A-A of FIG. 1.
Figure 8:
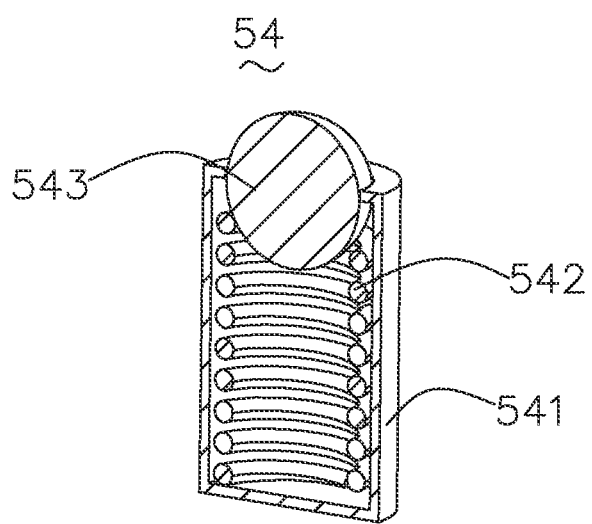
FIG. 8 is an illustrative cross-sectional view of the positioning bead assembly of the smart wearable device.

Referring to the FIG. 3 and FIG. 4. FIG. 3 is a partially exploded view and a partially enlarged view of partly members when the smart wearable device 100 is in a folded state. FIG. 4 is a partially exploded view and a partially enlarged view of partly members when the smart wearable device 100 is in an unfolded state. The glass frame 1 includes a connecting portion 11 connected with the temple 2. The connecting portion 11 of the glass frame 1 is provided with a through hole 12 passing through the connecting portion 11 and a pair of receiving groove 13. The receiving grooves 13 are respectively recessed inward from an upper surface and a lower surface of the glass frame 1 and do not penetrate the glass frame 1. Two receiving grooves 13 are aligned with each other along a thickness direction of the connecting portion 11. The through hole 12 is closer to an outside than the receiving groove 13.

Each temple 2 includes a shelf 3, a cover plate 4 covered with the shelf 3 to form a receiving space 30, and a rotating shaft assembly 5 accommodated in the receiving space 30 and matched with the connecting portion 11 of the glass frame 1.

The shelf 3 includes an upper wall 31 and a lower wall 32 opposite to the upper wall 31. The connecting portion 11 of the glass frame 1 is received in an end of the shelf 3 proximal to the glass frame 1. That is, the connecting portion 11 is received between the upper wall 31 and the lower wall 32 of the end. The shelf 3 includes a plurality mounting slots 33, and the number of the mounting slots 33 is two. Two mounting slots 33 are arranged facing each other.

The rotating shaft assembly 5 includes a first rotating shaft bracket 51 fixed with the upper wall 31, a second rotating shaft bracket 52 fixed with the lower wall 32, a screw 53 connected between the first rotating shaft bracket 51 and the second rotating shaft bracket 52, and at least one positioning bead assembly 54 mounted with the connecting portion 11 of the glass frame 1. The positioning bead assembly 54 is movably connected between the first rotating shaft bracket 51 and the second rotating shaft bracket 52 to realize the folded state and the unfolded state of the smart wearable device 100.

The first rotating shaft bracket 51 is a block structure, and the first rotating shaft bracket 51 is made of metal material. The first rotating shaft bracket 51 is installed in the mounting slot 33 on the upper wall 31 of the shelf 3. A surface of the first rotating shaft bracket 51 facing the positioning bead assembly 54 is provided with a first groove 511 and a second groove 512 spaced apart from the first groove 511. The first groove 511 and the second groove 512 are circular. The first rotating shaft bracket 51 is provided with a first mounting hole 513.

The second rotating shaft bracket 52 has a same structure with the first rotating shaft bracket 51. The second rotating shaft bracket 52 is also a block structure, and the second rotating shaft bracket 52 is made of metal material. The second rotating shaft bracket 52 is installed in the mounting slot 33 on the lower wall 32 of the shelf 3. A surface of the second rotating shaft bracket 52 facing the positioning bead assembly 54 is provided with the first groove 521 and the second groove 522 spaced apart from the first groove 521. The first groove 521 and the second groove 522 are circular.

The first groove 511 on the first rotating shaft bracket 51 is disposed facing to the first groove 521 on the second rotating shaft bracket 52, and the second groove 512 on the first rotating shaft bracket 51 is disposed facing to the second groove 522 on the second rotating shaft bracket 52. The second rotating shaft bracket 52 is provided with a second mounting hole 523. The second mounting hole 523 is arranged facing to the first mounting hole 513 on the first rotating shaft bracket 51.

The screw 53 is inserted through the through hole 12 of the connecting portion 11 of the glass frame 1 so that the connecting part 11 can rotate around the screw 53. The screw 53 passes through the lower wall 32 of the shelf 3, the second rotating shaft bracket 52, the connecting portion 11 of the glass frame 1, and the first rotating shaft bracket 51 in sequence. One end of the screw 53 is provided with a nut, and the other end of the screw 53 is provided with a threaded structure. The nut abuts against the lower wall 32 of the shelf 3. The first rotating shaft bracket 51 is connected and fixed to the screw 53 by the threaded structure.

A number of the positioning bead assemblies 54 is two. One end of one positioning bead assembly 54 is received in one receiving groove 13 of the connecting part 11 of the frame 1, and the other end abuts against the first rotating shaft bracket 51. One end of the other positioning bead assembly 54 is received in the other receiving groove 13 of the connecting part 11 of the frame 1, and the other end abuts against the second rotating shaft bracket 52.

The positioning bead assembly 54 has a cylindrical structure as a whole. The positioning bead assembly 54 includes a housing 541, a spring 542 contained in the housing 541, and a bead 543 installed at the end of the spring 542. The bead 543 is partially received in the housing 541 and partially extending out of the housing 541. The bead 543 presses the spring 542 along a direction of a center line of the housing 541 when the bead 543 moves.

When the smart wearable device 100 is in the folded state, the bead 543 of one positioning bead assembly 54 partially located in the first groove 511 of the first rotating shaft bracket 51, and the bead 543 of the other positioning bead assembly 54 partially located in the first groove 521 of the second rotating shaft bracket 52.

When the smart wearable device 100 changes from the folded state to the unfolded state, the temple 2 brings the screw 53 to rotate relative to the glass frame 1, and the positioning bead assemblies 54 arranged on both sides of the glass frame 1 are affected by the first rotating shaft bracket 51 and the second rotating shaft bracket 52 is pressed, the beads 543 on both sides shrink inwardly and press the spring 542. During the rotation of the temples 2, the beads 543 are abutted against the surfaces of the first rotating shaft bracket 51 and the second rotating shaft bracket 52. In contrast, the positioning bead assembly 54 exerts a certain pressure on the temple 2, so during the rotation of the temple 2, the temple 2 can stay at any position where the positioning bead assembly 54 is located between the first grooves 511, 521 and the second grooves 521, 522, and the temple 2 is not easy to shake.

When the smart wearable device 100 is in a fully unfolded state: the bead 543 of one positioning bead assembly 54 is partially located in the second groove 512 of the first rotating shaft bracket 51, and the bead 543 of the other positioning bead assembly 54 is located in the second groove 522 of the second rotating shaft bracket 52.

In the present invention, the rotating shaft assembly 5 is composed of the first rotating shaft bracket 51, the second rotating shaft bracket 52, the screw 53, and the positioning bead assembly 54. The whole structure is simple, and the requirements of the processing accuracy and assembly accuracy of components are low. The smart wearable device 100 achieves the rotational damping effect of the temple 2 with a simple structure, and the product development cost is low. Since the rotating shaft assembly 5 realizes the rotation damping effect of the temple 2, the temple 2 can stably stay in any position where the positioning bead assembly 54 is located between the two grooves, and the temple 2 is not easy to shake. The rotation effect of the temple 2 is good, and the experience of user is enhanced. At the same time, due to mutual friction between the bead 543 and the first and second rotating shaft bracket during the movement of the temple 2, the first rotating shaft bracket 51 and the second rotating shaft bracket 52 are made of metal materials with good wear resistance. This design increases the service life of the rotating shaft assembly 5.

Comparing with the related art, the present invention provides a smart wearable device including a glass frame and a pair of temples extending backward from both sides of the glass frame. The glass frame includes a connecting portion connected with the temple. Each temple including: a shelf, a cover plate covered with the shelf to form a receiving space, and a rotating shaft assembly accommodated in the receiving space and matched with the connecting portion of the glass frame. The shelf includes an upper wall and a lower wall opposite to the upper wall. The rotating shaft assembly includes a first rotating shaft bracket fixed with the upper wall, a second rotating shaft bracket fixed with the lower wall, a screw connected between the first rotating shaft bracket and the second rotating shaft bracket, and a positioning bead assembly mounted with the connecting portion. The positioning bead assembly is movably connected between the first rotating shaft bracket and the second rotating shaft bracket to realize a folded state and an unfolded state of the smart wearable device.

The smart wearable device of the present invention provides a rotating shaft assembly composed of the first rotating shaft bracket, the second rotating shaft bracket, the positioning bead assembly, and the screw to realize the folded and unfolded states of the smart wearable device. The smart wearable device has a simple structure, and the simple structure achieves the damping effect of the rotation of the temples. It is not easy to shake during the rotation of the temples. The rotation effect of the temples is good, and the user experience is enhanced. At the same time, the requirements of the processing accuracy and assembly accuracy of components are low, and the development cost is low.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A smart wearable device, comprising:
   a glass frame, the glass frame comprising a connecting portion; and
   a pair of temples extending backward from both sides of the glass frame, the connecting portion connected with the temple, each temple comprising:
   a shelf, the shelf comprising an upper wall and a lower wall opposite to the upper wall;
   a cover plate covered with the shelf to form a receiving space; and
   a rotating shaft assembly accommodated in the receiving space and matched with the connecting portion of the glass frame, the rotating shaft assembly comprising:
   a first rotating shaft bracket fixed with the upper wall;
   a second rotating shaft bracket fixed with the lower wall;
   a screw connected between the first rotating shaft bracket and the second rotating shaft bracket; and
   at least one positioning bead assembly mounted with the connecting portion, the positioning bead assembly movably connected between the first rotating shaft bracket and the second rotating shaft bracket to realize a folded state and an unfolded state of the smart wearable device.

2. The smart wearable device as described in claim 1, wherein the positioning bead assembly comprises a housing, a spring contained in the housing, and a bead installed at the end of the spring and partially extending out of the housing, the bead pressing the spring along a direction of a center line of the housing when the bead moves.

3. The smart wearable device as described in claim 2, wherein a number of the positioning bead assemblies is two, one positioning bead assembly abutting against the first rotating shaft bracket, and the other positioning bead assembly abutting against the second rotating shaft bracket.

4. The smart wearable device as described in claim 3, wherein a surface of the first rotating shaft bracket facing the positioning bead assembly and/or a surface of the second rotating shaft bracket facing the positioning bead assembly is provided with a first groove and a second groove spaced apart from the first groove, the bead partially located in the first groove when the smart wearable device is in the folded state, and the bead partially located in the second groove when the smart wearable device is in the unfolded state.

5. The smart wearable device as described in claim 4, wherein the connecting portion of the glass frame is provided with a through hole passing through the connecting portion, and the screw is inserted through the through hole.

6. The smart wearable device as described in claim 4, wherein the connecting portion of the glass frame comprises a receiving groove for receiving the positioning bead assembly.

7. The smart wearable device as described in claim 1, wherein the first rotating shaft bracket comprises a first mounting hole for installing the screw, and the second rotating shaft bracket comprises a second mounting hole for installing the screw, the screw passing through the lower wall of the shelf, the second rotating shaft bracket, the connecting portion of the glass frame, and the first rotating shaft bracket in sequence.

8. The smart wearable device as described in claim 7, wherein the first rotating shaft bracket connected and fixed with the screw by a threaded structure.

9. The smart wearable device as described in claim 1, wherein the first rotating shaft bracket and the second rotating shaft bracket are made of metal material.

10. The smart wearable device as described in claim 1, wherein the shelf comprises a mounting slot for correspondingly receiving and fixing the first rotating shaft bracket and the second rotating shaft bracket.

* * * * *